(12) United States Patent
Andresen et al.

(10) Patent No.: US 11,686,292 B2
(45) Date of Patent: Jun. 27, 2023

(54) METHODS AND SYSTEM FOR TRANSPORTING A COMPONENT OF A WIND TURBINE

(71) Applicant: Siemens Gamesa Renewable Energy A/S, Brande (DK)

(72) Inventors: Peter Andresen, Holstebro (DK); Michell Mirsbach Olsen, Aarhus C (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 39 days.

(21) Appl. No.: 17/241,277

(22) Filed: Apr. 27, 2021

(65) Prior Publication Data

US 2021/0332794 A1 Oct. 28, 2021

(30) Foreign Application Priority Data

Apr. 28, 2020 (EP) ..................................... 20171804

(51) Int. Cl.
*F03D 13/40* (2016.01)

(52) U.S. Cl.
CPC .......... *F03D 13/40* (2016.05); *F05B 2230/61* (2013.01)

(58) Field of Classification Search
CPC . B64F 5/50; F03D 13/40; F03D 13/10; F03D 13/20
See application file for complete search history.

(56) References Cited

U.S. PATENT DOCUMENTS

| | | | |
|---|---|---|---|
| 2016/0327018 A1* | 11/2016 | Botwright | ............... F03D 13/10 |
| 2019/0285057 A1 | 9/2019 | Jensen et al. | |
| 2020/0056740 A1 | 2/2020 | Aboumalwa | |

FOREIGN PATENT DOCUMENTS

| | | |
|---|---|---|
| CN | 207241559 U | 4/2018 |
| EP | 3617499 A1 | 3/2020 |
| JP | 2002029306 A | 1/2002 |

OTHER PUBLICATIONS

European Search Report dated Oct. 7, 2020 for application No. 20 171 804.6.

* cited by examiner

*Primary Examiner* — Christopher J Besler
(74) *Attorney, Agent, or Firm* — Schmeiser, Olsen & Watts LLP (57) ABSTRACT

Provided is a method for transporting a component of a wind turbine to a storing position, wherein the component is mounted on a transport frame, including providing a transport arrangement including at least two elongate, height-adjustable, self-propelled transporter units, positioning the transport frame with the component mounted thereon onto the transport arrangement such that the self-propelled transporter units are spaced apart by a predefined lateral distance from each other, using the transport arrangement, rolling the component to a storing position where at least one support device has been positioned, such that at least a part of the at least one support device is located between a pair of the self-propelled transporter units, lowering the self-propelled transporter units such that the transport frame comes to rest on the at least one support device, and removing the transport arrangement from under the supported transport frame.

11 Claims, 11 Drawing Sheets

METHODS AND SYSTEM FOR TRANSPORTING A COMPONENT OF A WIND TURBINE

CROSS-REFERENCE TO RELATED APPLICATIONS

This application claims priority to European Application No. 20171804.6, having a filing date of Apr. 28, 2020, the entire contents of which are hereby incorporated by reference.

FIELD OF TECHNOLOGY

The following concerns methods and a system for transporting a component of a wind turbine, in particular a wind turbine generator and/or a component comprising a wind turbine generator, wherein the component is mounted on an, in particular flat, transport frame.

BACKGROUND

The transport of heavy, compact components for wind turbines, which usually weigh multiple tons, is still a challenge. Examples for such heavy components in particular include wind turbine generator components fully assembled (nacelle, generator and hub), partly assembled (nacelle and generator) and as individual components hub, generator and/or nacelle. Two general concepts are known to allow transportation of such a component on a vessel.

The first concept is known as roll-on/roll-off (RORO). In this approach, the component is rolled on and off the vessel using self-propelled modular transporters (SPMT) or other self-propelled transporters. To enable this operation, the component is mounted on a heavy and expensive tunnel-frame.

In an alternative approach, which is termed lift-on/lift-off (LOLO), the component may be mounted on a cheaper and less complex flat transport frame, where, however, the vessel needs to be equipped with a crane or the like to hoist the component on the frame onto the vessel.

Compared to LOLO, RORO allows for faster loading/unloading, which makes it a less expensive alternative, however, flat frames do not fit with the RORO concept, since the SPMT or other self-propelled transporter cannot be released from a frame without tunnels.

SUMMARY

An aspect relates to the use of less expensive flat transport frames without tunnels in an RORO approach.

In a first aspect, embodiments of the invention concern a method for transporting a component of a wind turbine, in particular a wind turbine generator and/or a component comprising a wind turbine generator, to a storing position, wherein the component is mounted on an, in particular flat, transport frame. The method comprises the steps of
providing a transport arrangement comprising at least two elongate, height-adjustable, self-propelled transporter units, in particular SPMT units,
positioning the transport frame with the component mounted thereon onto the transport arrangement such that the parallel self-propelled transporter units are spaced apart by at least a predefined lateral distance from each other,
using the transport arrangement, rolling the component to a storing position where at least one support device has been positioned, such that at least a part of the at least one support device is located between a pair of the at least two self-propelled transporter units,
lowering the self-propelled transporter units such that the transport frame comes to rest on the at least one support device,
removing the transport arrangement from under the supported transport frame.

A lateral distance, in this context, is a distance in a horizontal, lateral direction perpendicular to the longitudinal direction of the elongate self-propelled transporter units. In an embodiment, while the parallel self-propelled transporter units are spaced apart by at least the predefined lateral distance from each other, the front and/or back edges of the self-propelled transporter units are flush, and/or the self-propelled transporter units have the same length.

In particular, the at least one support device to be received between the at least one pair of self-propelled transporter units, that is, in the free space spanned by the lateral distance, have a width of maximally the predefined lateral distance. In other words, the predefined lateral distance may be defined as being the width of the at least one support device to be located between the pair of self-propelled transporter units, in particular additionally comprising a predefined tolerance value describing a required remaining clearance between the support device and the self-propelled transporter units.

Embodiments of the invention thus proposes to arrange at least one pair of self-propelled transporter units in a parallel fashion in such a manner that a free space between those two self-propelled transporter units results, wherein this free space is open/accessible at least in a movement direction of the resulting transport arrangement when transporting the transport frame to the storing position, that is, at the leading end or front end. For example, if the at least two self-propelled transporter units are connected mechanically at the trailing end opposite to the front, a fork-like configuration results, comparable, for example, to a forklift. A support device may be received in the free space by moving the transport arrangement with the transport frame and component on it relatively to the support device, such that the, in particular flat, transport frame may conveniently be placed above the support device. If the transport frame with the component on it is now lowered, the transport frame comes to rest on the at least one support device. The transport arrangement, in particular the self-propelled transporter units, no longer carries the load of the transport frame and the component and can hence, in particular after reversing the movement direction, be removed from under the supported transport frame, again by virtue of the fact that the free space between the at least one pair of self-propelled transporter units is open at at least one end.

In other words, the transport arrangement with its self-propelled transporter units, in particular SPMTs, is configured in a "forklift"-like or fully open, as described below, configuration, such that it can be positioned with an appropriately prepared support device in between. In this manner, the transport frame with the component thereon can, on the one hand, be moved on a spread transport arrangement allowing load distribution and stable support during transport, and, on the other hand, be stably stored in the storing position by being able to provide, in particular additionally, a central support device carrying the load in a central area of the transport frame, where usually the most load from the wind turbine component is to be carried. In this manner, in particular also deflexion and/or bending in a central area of the frame can be prevented or reduced.

By enabling easy and stable transport as well as easy and stable storing on support devices, which may also be positioned in a central area of the transport frame, embodiments of the invention in particular allows to utilize low cost flat transport frames with RORO-equipped vessels. Loading and unloading of the wind turbine component on the flat transport frame is allowed without requiring a crane. However, apart from use for a vessel, the method according to the first aspect can also be applied to other storing locations, for example for temporary storage in a warehouse and the like. In summary, low-cost flat transport frames without tunnels may be used on low-cost vessels equipped for the RORO approach. The component on the transport frame may be loaded and unloaded using SPMT or similar self-propelled transporters without a crane.

As seen in the transport system according to embodiments of the invention, which comprises the transport arrangement and the at least one support device, these components are matched to each other in their dimensions and functionality. For example, the transport arrangement is adapted to be configured such that at least a part of at least one of the support devices fits into the free space between the at least one pair of self-propelled transporter units. That is, the predefined lateral distance is equal to, in particular including a tolerance value, or at least slightly larger than the corresponding width of the at least one support device or its part, respectively. The height of the at least one support element falls into the range that is adjustable for the self-propelled transporter units, such that the self-propelled transporter units may be adjusted to a larger height when the transport frame is to be placed above the at least one support device and may be adjusted to a lower height when the transport frame is to be placed on the at least one support element or the self-propelled transporter units are to be positioned below the transport frame still supported on the at least one support element. The transport system according to embodiments of the invention may also comprise the, in particular flat, transport frame. In this regard, the at least one support element is dimensioned and the transport arrangement may be configured to stably carry the transport frame, respectively.

Since the transport system according to embodiments of the invention is to be used for performing any of the methods according to embodiments of the invention, all features and remarks regarding the methods according to embodiments of the invention also apply to the transport system according to embodiments of the invention and vice versa.

It is noted that, preferably, the height adjustability of the self-propelled transporter units may be provided by a hydraulic device, however, other adjustment means, for example those comprising an electrical actuator, may also be employed.

Regarding the wind turbine component to be transported, the component may, preferably, comprise a nacelle with a wind turbine generator housed therein and a hub. However, the component may also be the wind turbine generator itself, the nacelle or hub without generator, or the nacelle with the generator housed therein. Of course, also other components of the wind turbine can be transported using the methods and system of embodiments of the invention.

Of course, the transport arrangement may also be used to transport the transport frame with the component away from the storing position at a later point in time or from a previous storing position to transport it to the current storing position. For example, such a process may comprise the following steps:

positioning the transport arrangement under the transport frame in its storage position, such that at least a part of the at least one support device is located between a pair of the at least two self-propelled transporter units, which are spaced apart by at least the predefined lateral distance from each other, increasing the height of the self-propelled transporter units such that the transport frame is lifted from the at least one support device and supported on the self-propelled transporters, and transporting the transport frame away from the storing position using the transport arrangement.

In principle, the relative orientation of the self-propelled transporter units to the transport frame, which preferably has an at least essentially rectangular base shape, is arbitrary. It may, however, be advantageous if the self-propelled transporter units are arranged parallel to at least one pair of parallel base sides of the transport frame. That is, in particular, the frame has an at least essentially rectangular base shape having two orthogonal pairs of parallel base sides, wherein the self-propelled transporter units are arranged parallel to the base sides of one of the pairs. This may simplify maneuvering while transporting the component.

As already shortly discussed, the self-propelled transporter units may be mechanically spaced apart by employing a spacer unit at a trailing end of the self-propelled transporter units or the self-propelled transporter units may be electronically spaced apart by controlling the self-propelled transporter units synchronously. In a first concrete embodiment, a forklift-like configuration is implemented by using a spacer unit as a part of the transport arrangement. The spacer unit may, preferably, have a width equal to the predefined lateral distance and can be coupled to both of a pair of the self-propelled transporter units at their end, for example such that a fork-like arrangement and/or a shape like that of a long U results. The spacer unit mechanically enforces the parallelism of the self-propelled transporter units as well as the predefined lateral distance and thus the free space.

However, in an alternative, second embodiment, this parallelism and the keeping of at least the predefined lateral distance may also be enforced electronically by respectively controlling the self-propelled transporter units to operate in a synchronous manner, once the configuration defining the free space has been adjusted. Such a synchronous mode is already known for control systems for self-propelled transporter units, in particular SMPTs.

It is noted that, independently from these two alternative embodiments, the transport system according to embodiments of the invention may, of course, comprise a control device for controlling operation of the self-propelled transporter units/transport arrangement. In particular, the control device or a part thereof may be a part of the transport arrangement and/or even allow autonomous operation, in particular when driving the transport frame with the component to the storing position and/or removing the transport arrangement from under the transport frame when stored. The control device may, of course, also be configured to control the operation of the height adjustment the self-propelled transporter units.

In a preferred embodiment, multiple support devices may be used, wherein the at least one support device to be located between the pair of self-propelled transporter units supports the transport frame centrally when it is lowered onto the support devices and wherein at least one of the support devices is positioned such that it supports the transport frame laterally when it is lowered onto the support devices.

For example, three, in particular elongate, support devices may be used, one supporting the transport frame centrally, the other two laterally. In a concrete embodiment, the three, in particular elongate, parallelly oriented support devices are positioned at the storing position such that each of the two self-propelled transporter units moves into a space between two support devices.

For example, generally, a beam and/or a concrete block may be used as at least one of the at least one support device. While beams, in particular comprising interface devices and/or retaining structures to provide a better hold of the transport frame, are preferably used on vessels, in storing positions having a non-swaying/non-rocking floor, simple concrete blocks may suffice to provide a secure standing of the transport frame with the wind turbine component.

In an especially preferred embodiment, at least one of the at least one support device comprises a retaining structure for retaining the supported transport frame in its storing position and/or a fastening means for fastening the supported transport frame in its storing position, in particular protrusions on its upper surface engaging with and/or receiving a corresponding frame structure. In this manner, in particular on a vessel, a more stable and secure standing of the transport frame with the component and the at least one support device is provided. For example, the at least one support element may comprise protrusions, for example triangular or pin-like protrusions, which engage into a recess, an opening, a cutout or other frame structure. The protrusions may preferably be tapered, such that they may be guided into a corresponding frame structure and a sort of auto-alignment while lowering the transport frame is achieved. Additionally or alternatively, fastening means may be provided, for example mechanical connections like pin and/or bolt connections, clamping connections, hook connections and the like.

In advantageous embodiments, shim elements and/or mechanical adjustment means, in particular on the at least one support device, may be used to configure a predefined, in particular balanced, support load distribution for the multiple support devices. In particular when using support devices having multiple support surfaces and/or multiple support devices, an uneven load distribution may occur, which may lead to reduced stability and/or localized wear effects. By using shim elements and/or mechanical adjustment means, for example adjustable support surfaces, the load distribution may be optimized, in particular regarding a balanced load distribution. For example, in a case wherein a central support device and two lateral support devices are used, shim elements or mechanical adjustment means may be utilized on the lateral support devices to ensure that load is also carried by the lateral support devices and not only by the central support device, where the centre of gravity of the wind turbine component, in particular the wind turbine generator, will be located.

Embodiments of the invention are preferably used to transport to storing positions on a vessel, in particular a water vessel, to be able to use the vessel to transport the wind turbine component to a destination, for example an erection site.

Hence, in a second aspect, embodiments of the invention also provide a method for transporting a component of a wind turbine, in particular a wind turbine generator and/or a component comprising a wind turbine generator, on a vessel. Such a method comprises:

transporting the component to a storing position on the vessel using a method according to first aspect, and moving the vessel to a destination while the component is stored in the storing position.

The vessel used may in particular be a water vessel, for example a ship. In this manner, wind turbine components can be transported to offshore destinations, where a wind turbine is to be erected.

After the vessel reaches its destination, the following steps may be performed:

positioning the transport arrangement under the transport frame in its storage position, such that at least a part of the at least one support device is located between a pair of the at least two self-propelled transporter units, which are spaced apart by at least the predefined lateral distance from each other, increasing the height of the self-propelled transporter units such that the transport frame is lifted from the at least one support device and supported on the self-propelled transporters, rolling the component from the vessel using the transport arrangement.

As already discussed regarding the first aspect, the transport arrangement may advantageously also be used to transport the transport frame with the component away from the storing position, for example to another storing or transporting position on a truck or directly to the erection site.

In advantageous embodiments, after the transport frame is lowered onto the support devices in the storing position, the transport frame and/or the at least one support device may be secured in position by additional securing means. In particular, the transport frame may be fixed to the at least one support device, for example using the already mentioned fastening means, in particular a pin or bolt connection. Alternatively or additionally, the transport frame and/or the at least one support device may be lashed down to the deck of the vessel to secure the transport frame in the storing position. In a concrete embodiment, at least one lashing the transport frame and/or the at least one support device, in particular comprising a D-ring and/or a cutout, are used for lashing the transport frame and/or the at least one support device down to the deck of the vessel.

BRIEF DESCRIPTION

Some of the embodiments will be described in detail, with references to the following Figures, wherein like designations denote like members, wherein.

DETAILED DESCRIPTION

Figure 1:
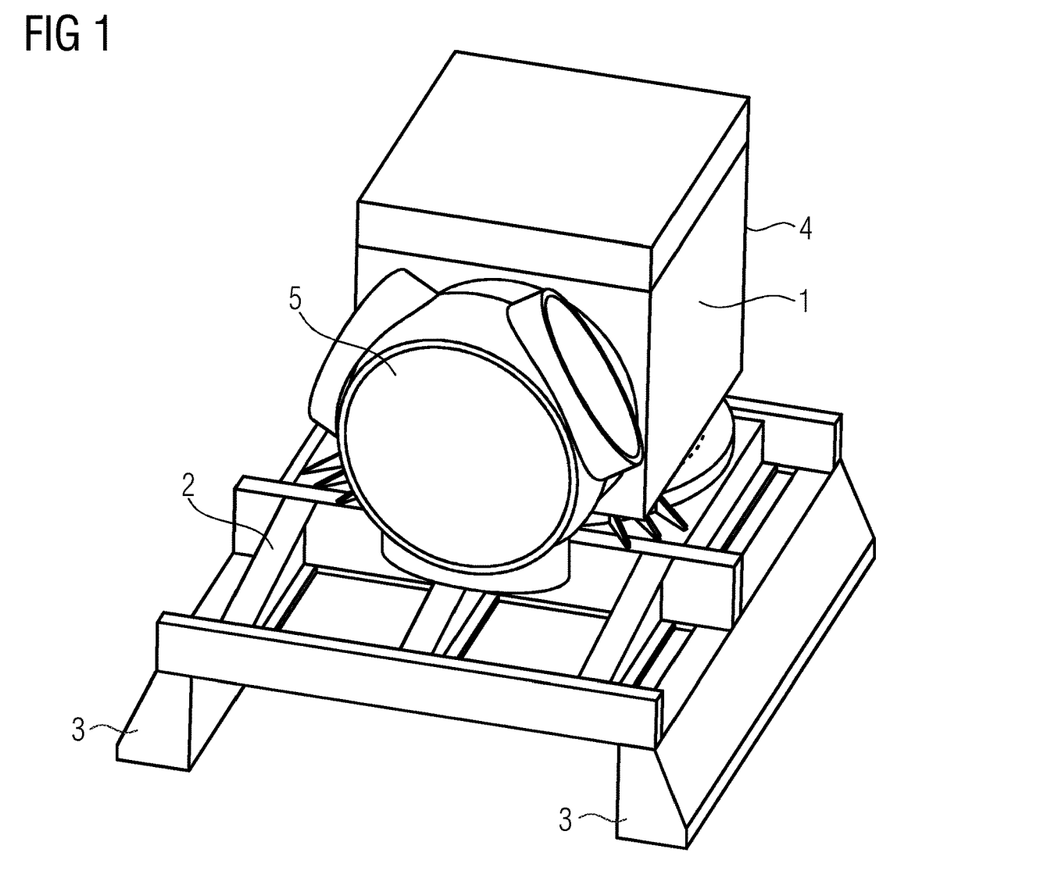
FIG. 1 depicts a transport frame having a wind turbine component mounted thereon, supported by production legs.

FIG. 1 schematically shows a wind turbine component 1 mounted onto a flat transport frame 2 without tunnels. In this situation, the transport frame 2 is still supported by its production legs 3, i.e. ready for pickup and transport to an intermediate storage, for example, a warehouse, until the wind turbine component 1 is required for the erection of a wind turbine.

In this embodiment, the wind turbine component 1 comprises a nacelle 4 already having a wind turbine generator installed therein, and a hub 5. However, the component 1 may also be the wind turbine generator itself, the nacelle 4 or hub 5 without the generator, or the nacelle 4 with the generator housed therein, but not yet attached hub 5.

For example, the flat transport frame 2 with the production legs 3, for example production beams, and the component 1 mounted thereon may have been transported using an internal transport mover system to a pickup position, for example outside the production facility on an intermediate storage station.

In the following figures, the component 1, although still present, is mostly omitted from the figures for simplicity of depiction and explanation.

Figure 2:
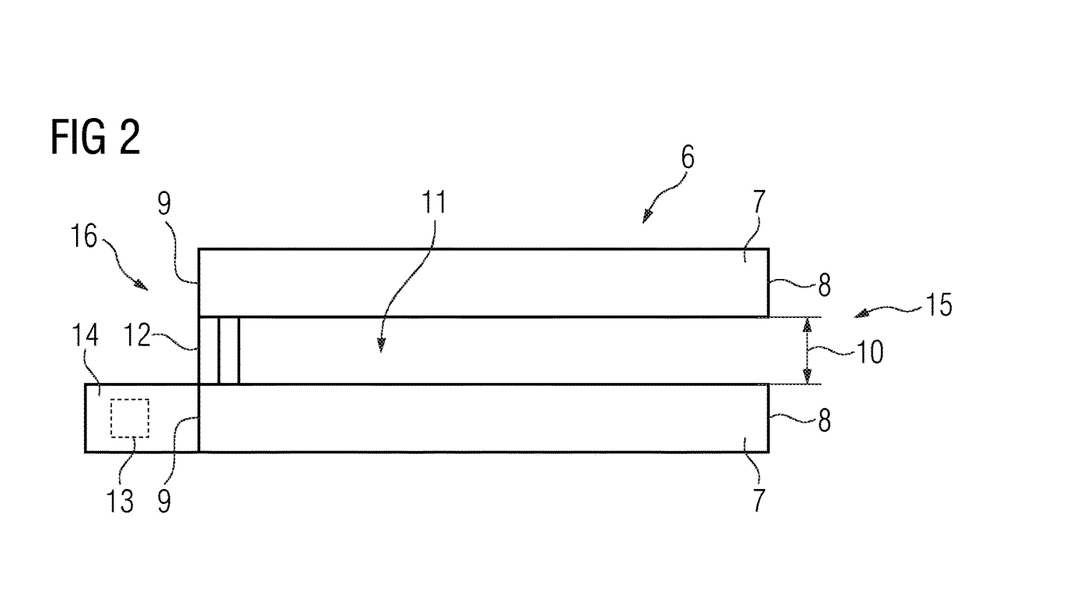
FIG. 2 depicts a prepared transport arrangement for transporting the transport frame to a storage position.

FIG. 2 shows a schematic drawing of an already-prepared transport arrangement 6 for transporting the transport frame 2 with the component 1 thereon to a storage position. The transport arrangement 6 comprises two self-propelled transporter units 7, in this case SMTPs, which are elongate and both have the same length. The self-propelled transporter units 7 are arranged parallelly and such that their front edges 8 as well as their rear edges 9 are flush. The parallel self-propelled transporter units 8 have a defined lateral distance 10, such that a free space 11 between the pair of self-propelled transporter units 7 is created. In FIG. 2, a minimum lateral distance 10 has been used, which can easily be provided mechanically by using a spacer unit 12 mechanically coupling the self-propelled transporter units 7 together such that they are parallelly oriented and have the lateral distance 10. However, it is also possible to arrange the self-propelled transporter units 7 as shown and use a synchronous operation mode thereafter, such that the relative position and orientation of the self-propelled transporter units 7 is maintained. Generally, the operation of the self-propelled transporter units 7 may be controlled by a control device 13, which may also be mechanically included into the transport arrangement 6 by connecting a control assembly 14, or may be configured to wirelessly control the self-propelled transporter units 7.

In the configuration shown in FIG. 2, where a spacer unit 12 is used, a fork-like geometry, comparable to a forklift, results, since the free space 11 is open at one end 15, which, in this case, will be the leading end (front end) regarding the moving direction while transporting the transport frame 2 with the component 1. The spacer unit 12 hence connects the self-propelled transporter units 7 at the opposing end 16, that is, the trailing end.

The lateral distance 10 is chosen such that a support device, as will be explained later, may be received in the free space 11 by moving the transport arrangement 6 relatively to the support device.

Figure 3:
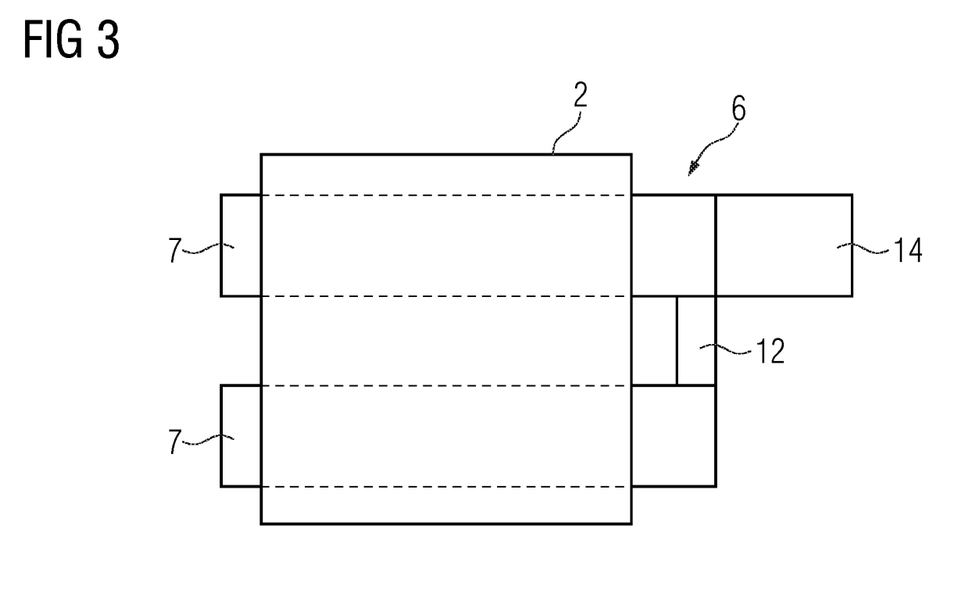
FIG. 3 depicts a schematic top view showing the transport arrangement being positioned below the transport frame on its production legs.
Figure 4:
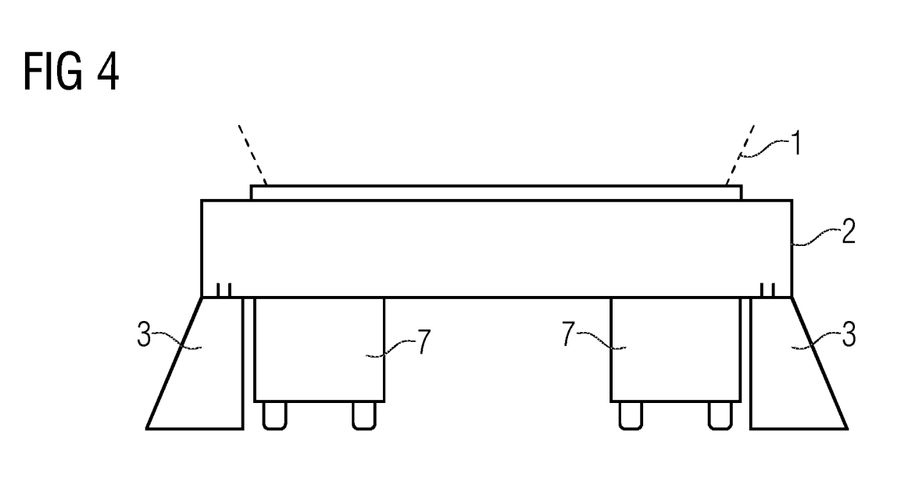
FIG. 4 depicts a schematic side view of the situation of FIG. 3.

To transport the flat frame 2 with the wind turbine component 1 mounted thereon, after preparation of the transport arrangement as shown in FIG. 2, the transport arrangement 6 is moved below the transport frame 2 as schematically shown in FIG. 3 and FIG. 4, which show a top view and a side view, respectively. As can be seen, the self-propelled transporter units 7 are moved below the transport frame 2 between the production legs 3.

Figure 5:
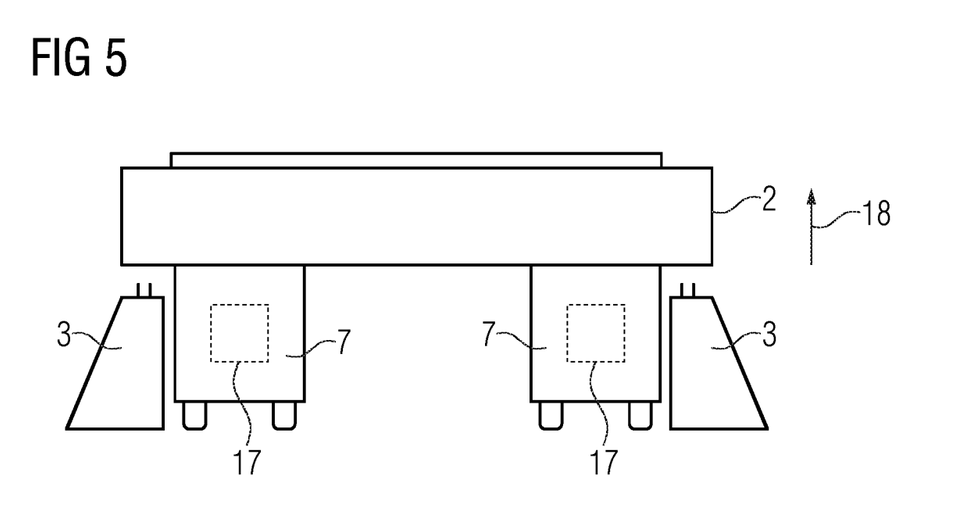
FIG. 5 depicts the schematic side view of FIG. 4 after lifting the transport frame by the transport arrangement.

In a following step, as illustrated in FIG. 5, hydraulic height adjustment means 17, for simplicity reasons only indicated in FIG. 5, are controlled by the control device 13 to increase the height of the self-propelled transporter units 7, hence lifting the transport frame 2 up from the production legs 3 and releasing any retaining coupling. This process is indicated by arrow 18.

Figure 6:
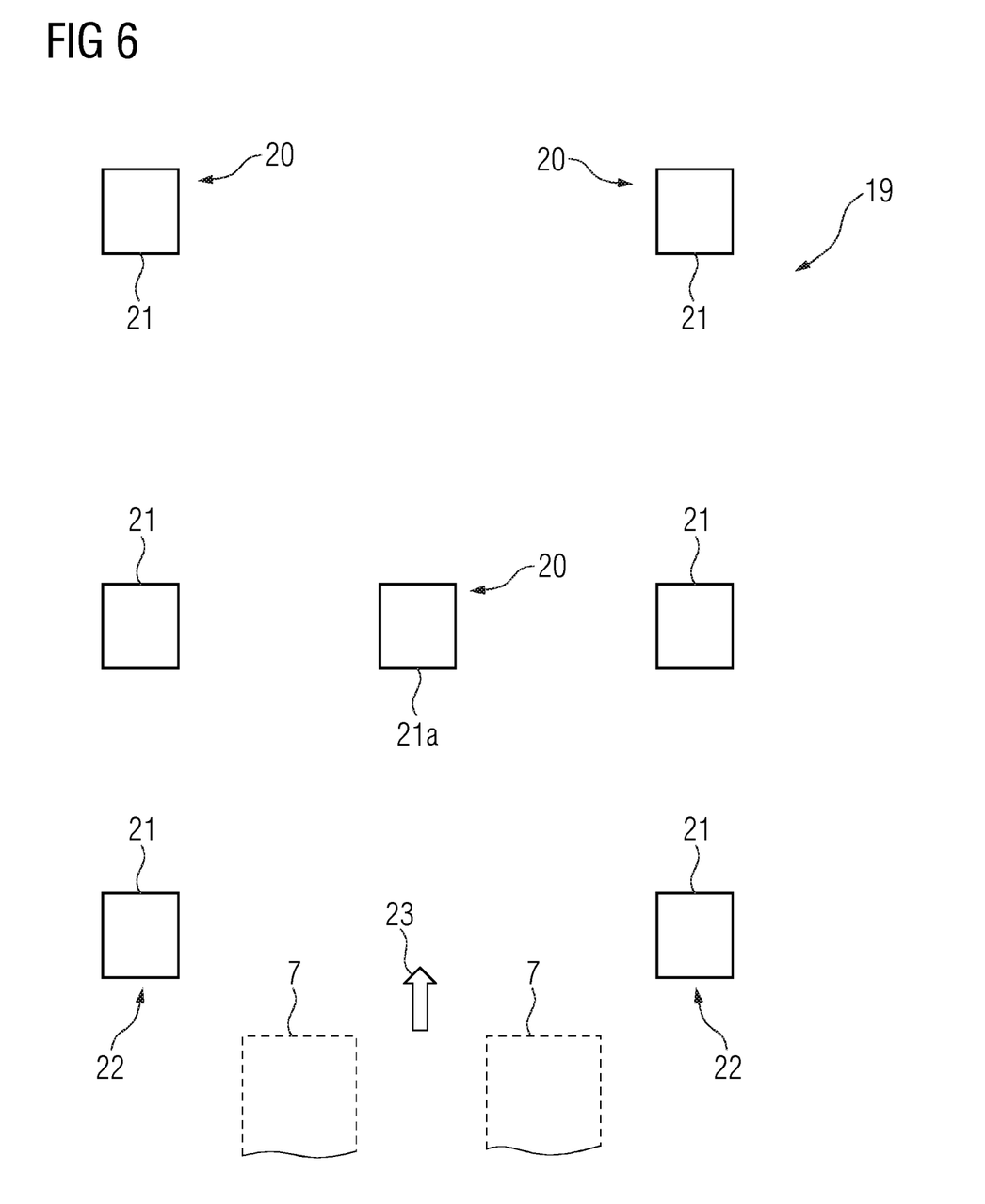
FIG. 6 depicts a prepared support arrangement comprising concrete blocks as support devices.

Since the transport frame 2 with the component 1 mounted thereon is now released from the production legs 3, it can be transported using the transport arrangement 6 to a storing position 19 in a warehouse, which has already been prepared as shown in FIG. 6. At the storing position 19, multiple support elements 20, in this case concrete blocks 21, 21a, have already been positioned in a certain pattern, with two lateral rows 22 and a single central concrete block 21a centrally between those outer rows 22.

Figure 7:
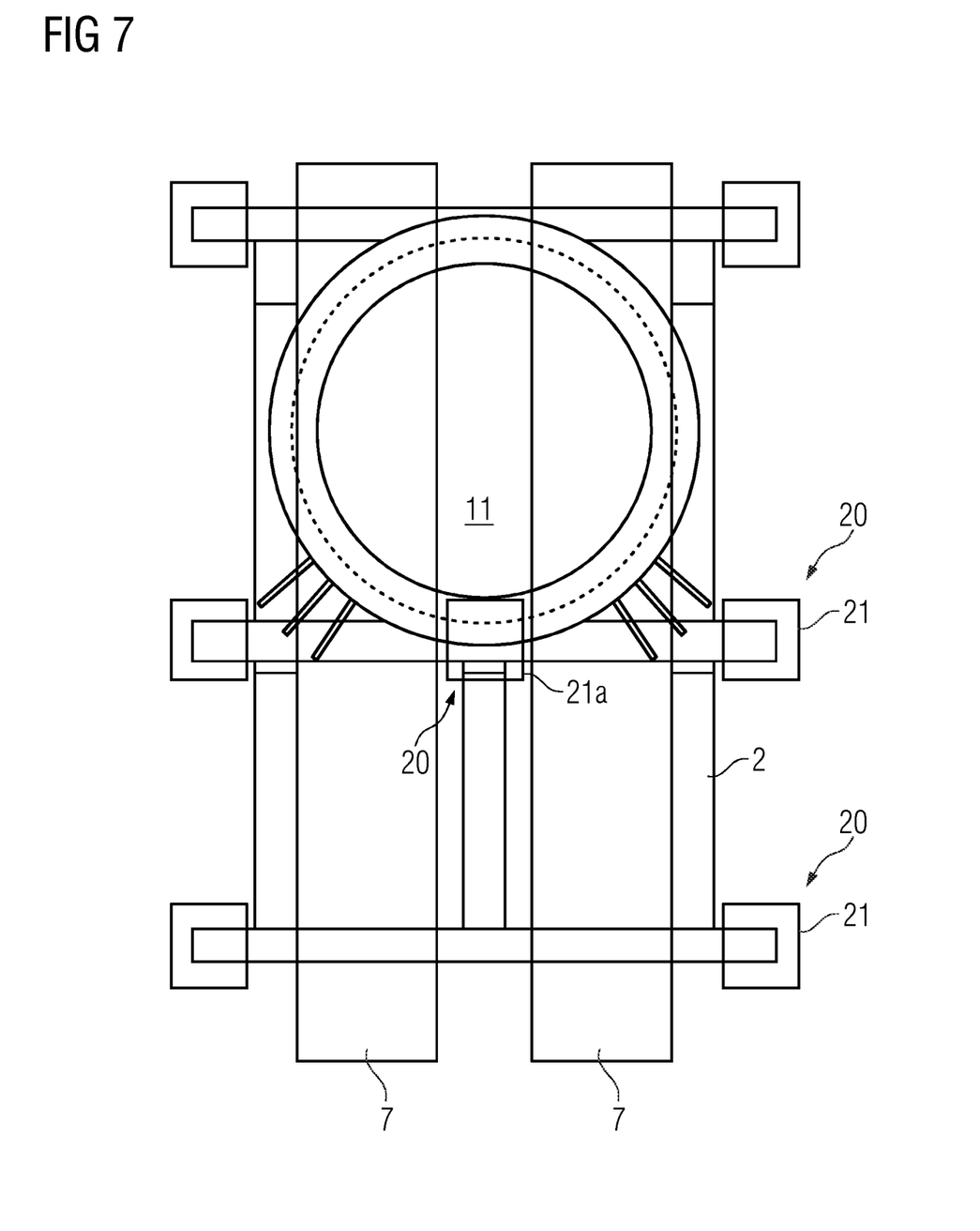
FIG. 7 depicts a schematic top view showing the transport frame being positioned above the support arrangement of FIG. 6.
Figure 8:
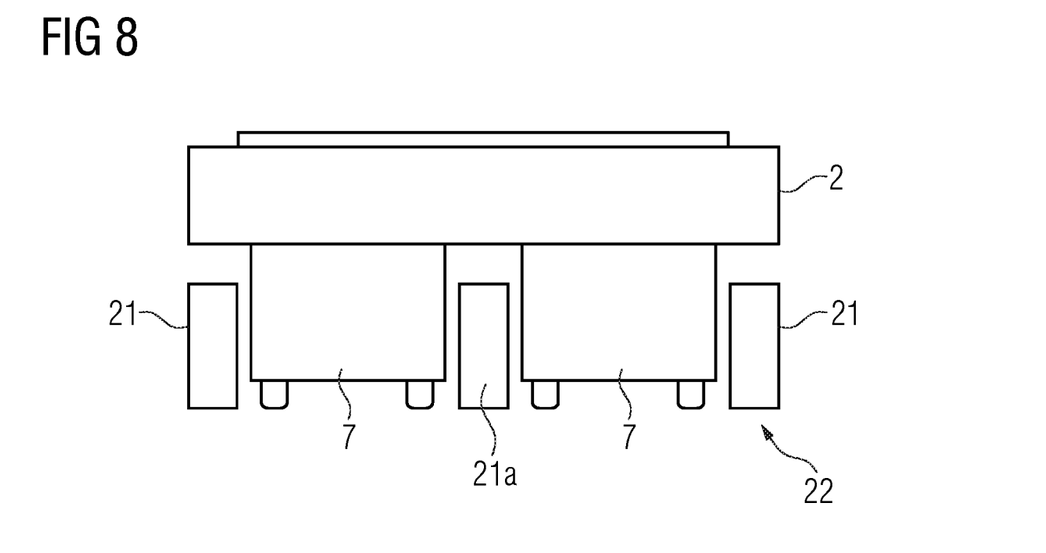
FIG. 8 depicts a schematic side view of the situation of FIG. 7.
Figure 9:
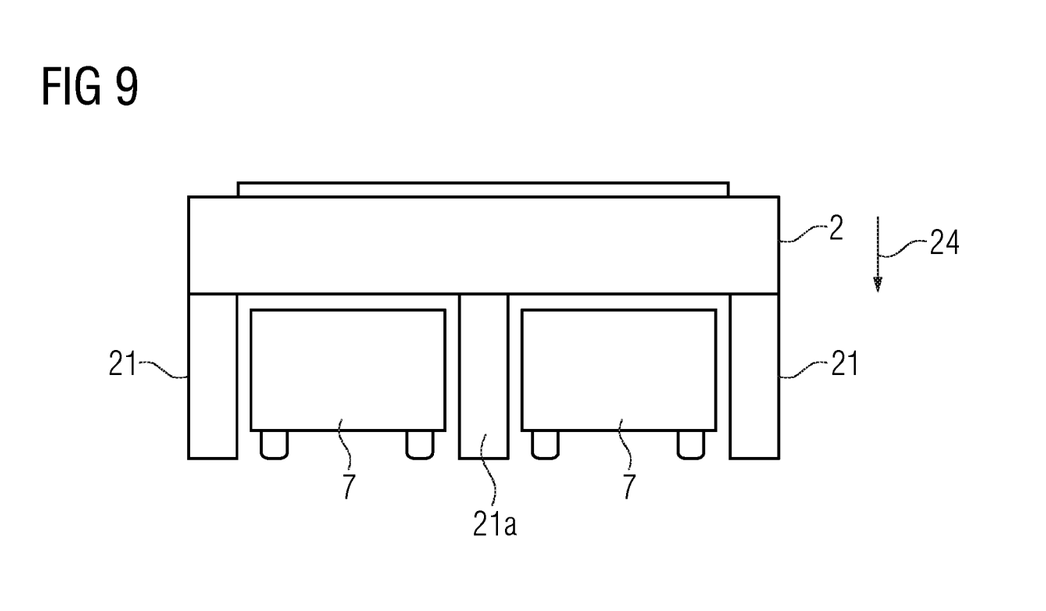
FIG. 9 depicts the schematic side view of FIG. 8 after lowering the transport frame onto the support arrangement.

The transport arrangement 6 is now, optionally autonomously, controlled such that the self-propelled transporter units 7 move the transport frame 2 above the support devices 20 according to arrow 23 indicating the movement direction. Due to the free space 11 between the self-propelled transporter units 7 being accessible at the leading end 15, the self-propelled transporter units 7 may move such that the concrete block 21a is received in the free space 11, as indicated in the top view of FIG. 7 and the side view of FIG. 8. The height adjustment means 17 may now be controlled again to decrease the height of the self-propelled transporter units 7 such that the transport frame 2 is lowered onto the concrete blocks 21, 21a as shown in FIG. 9 and indicated by arrow 24. Since the floor at the storing position 19 in the warehouse is not moving, like, for example, on a ship, the concrete blocks 21, 21a suffice as support devices 20 for stably, in particular for a longer time period, supporting the transport frame 2 with the wind turbine component 1 mounted thereon.

In particular, the central support device 20, that is, the concrete block 21a, which may be used due to the advantageous configuration of the transport arrangement 6 as described with respect to FIG. 2, receives load at the center of gravity of the transport frame 2 and the component 1, thus preventing sagging, in particular deflection and/or bending, of the transport frame 2.

Once the transport frame 2 has been lowered onto the support devices 20, in this case the concrete blocks 21, the transport arrangement 6 may be removed from under the transport frame 2, in particular by reversing movement direction such that the self-propelled transporter units 7 may pass the concrete block 21a with their open end 15 of the free space 11.

Figure 10:
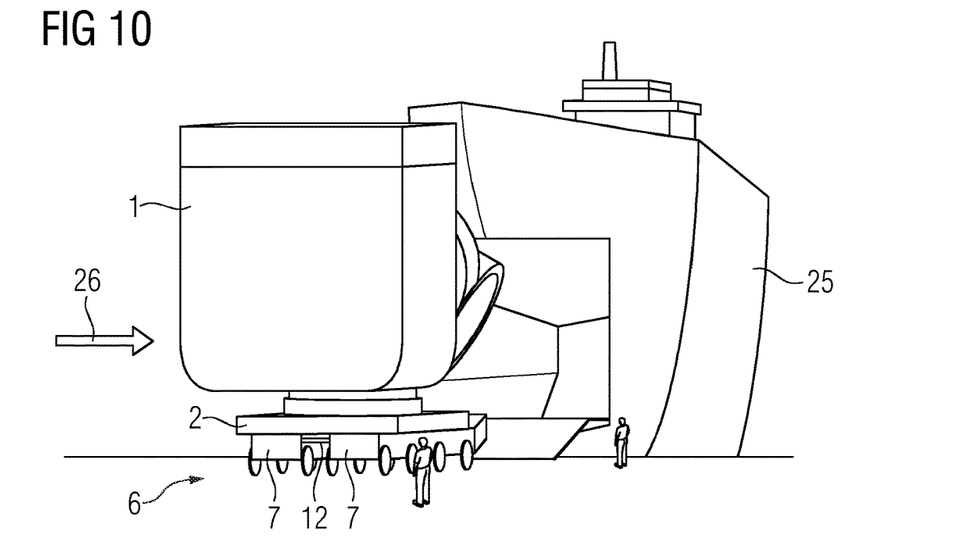
FIG. 10 depicts the transport frame being transported into a vessel.

If, at a later time, the wind turbine component 1 is to be used for erecting a wind turbine, the transport arrangement 6 may then be used to transport the transport frame 2 with the wind turbine component 1 thereon onto a vessel, in particular a storage position on a vessel. The transport arrangement 6 may again be brought into position below the transport frame 2, as already discussed regarding FIG. 3 and FIG. 4, wherein the concrete block 21 does not pose any problem due to the free space 11 in the configuration of the transport arrangement 6 shown in FIG. 2. The frame 2 is then lifted of the concrete blocks 21, 21a and may be transported onto the vessel 25, in this case a ship, as indicated by arrow 26 in FIG. 10.

Figure 11:
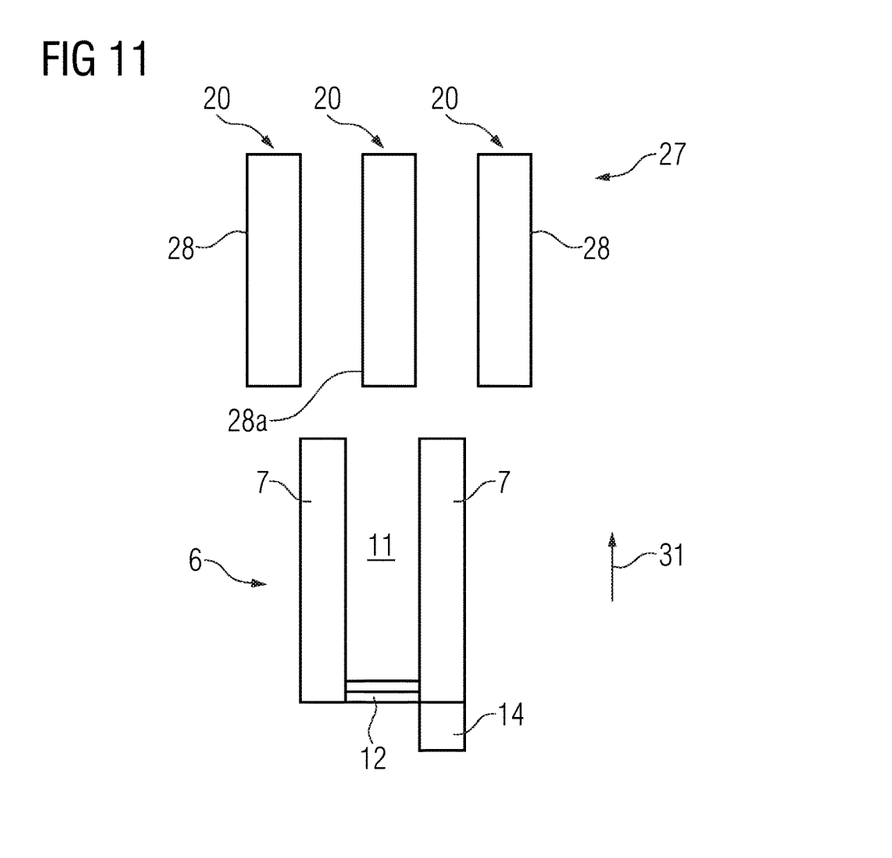
FIG. 11 depicts a schematic top view showing a prepared support arrangement of three beams as support devices on the vessel and the transport arrangement.

As shown in FIG. 11, the storing position 27 on the vessel 25 has already been prepared by positioning three parallel beams 28, 28a as support devices 20. Again, two lateral support devices 20, namely the beams 28, are positioned adjacent to a central support device 20, namely the beam 21a.

Figure 12:
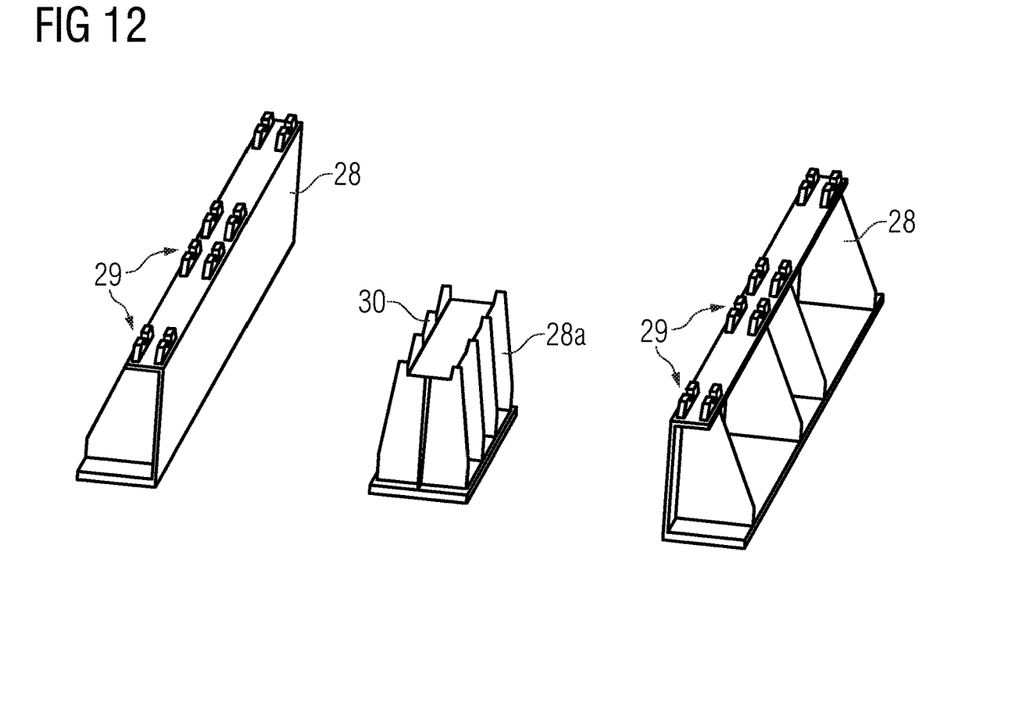
FIG. 12 depicts a concrete realisation of the beams of FIG. 11.

FIG. 12 shows an advantageous concrete embodiment of the elongate beams 28. As can be seen, the lateral beams 28 have protrusions 29 on their surface, in this case defining a space for receiving a corresponding structural feature of the frame 2. That is, the protrusions 29 form retaining structures engaging with a corresponding frame structure. The central beam 28a also comprises triangular protrusions 30 as retaining structures. It is noted that both the protrusions 29 and the protrusions 30 may be tapered, in case of the protrusions 29 also on their insides, to promote correct alignment of the transport frame 2 on the support elements 20.

The beams 28 may also have fastening means for fastening the transport frame 2 to the beams 28, 28a, which are, however, not shown in FIG. 12. Further, as will be discussed with respect to FIG. 14 and FIG. 15, the beams 28 comprise mechanical adjustment means to provide balanced load distribution.

FIG. 11 also schematically shows the transport arrangement 6 which moves in a movement direction 31 towards the storing position 27. As can be seen, each of the self-propelled transporter units 7 is moved in between two of the beams 28, 28a, such that the central beam 28a is received in the free space 11, not interfering with moving the transport frame to above the beams 28, 28a as support devices 20.

Figure 13:
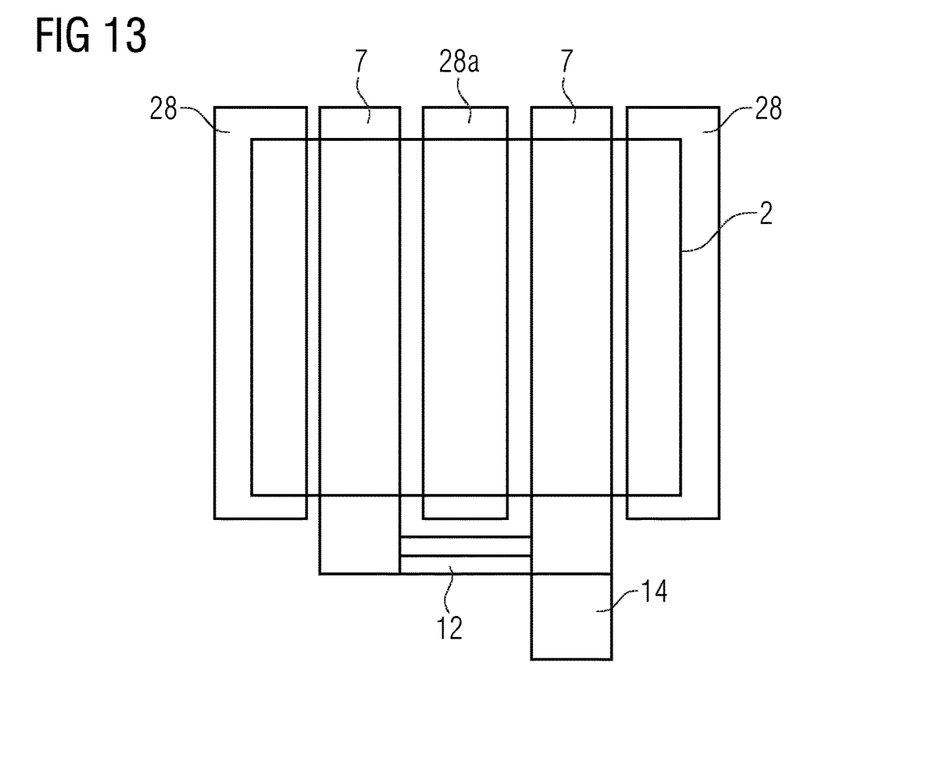
FIG. 13 depicts a schematic top view showing the transport frame being positioned above the support arrangement of FIG. 11.
Figure 14:
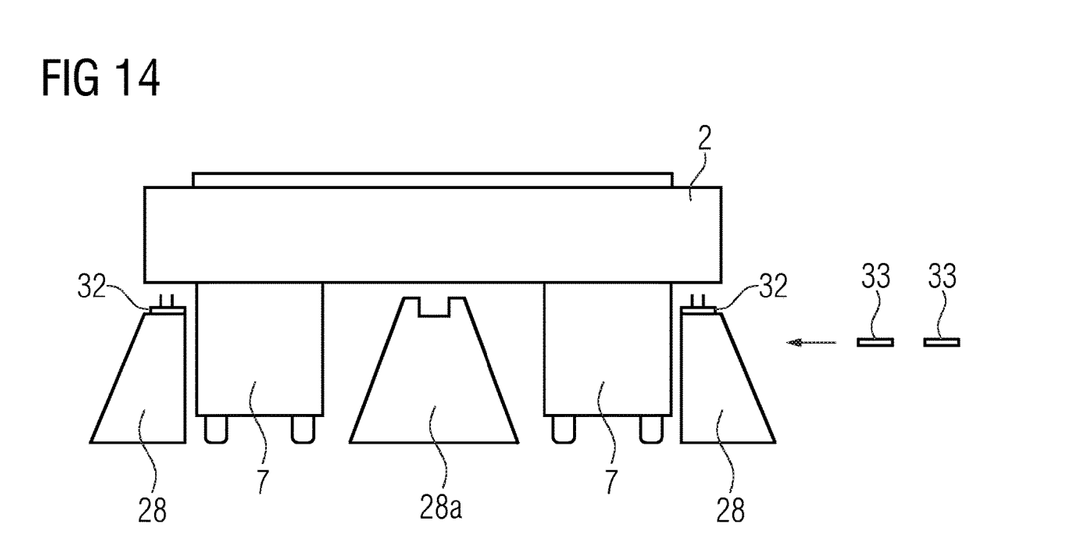
FIG. 14 depicts a schematic side view of the situation of FIG. 13.

The resulting configuration is schematically shown in FIGS. 13 and 14, providing a top view and a side view, respectively.

Figure 15:
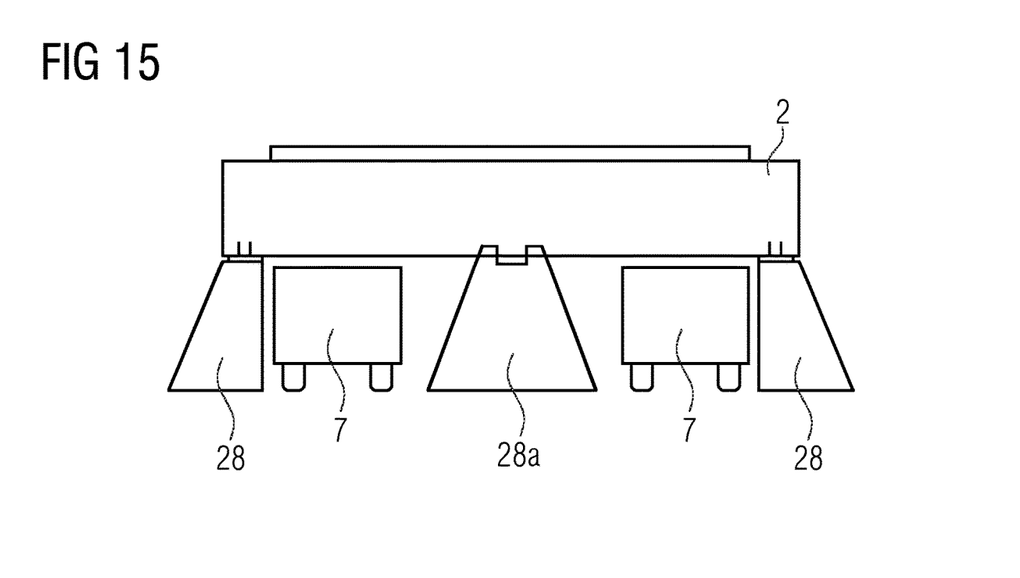
FIG. 15 depicts the schematic side view of FIG. 14 after lowering the transport frame onto the support arrangement.

Again, if the transport frame 2 is lowered by decreasing the height of the self-propelled transporter units 7, it is supported by the beams 28, 28a as support devices 20, as shown in FIG. 15. The transport arrangement 6, in particular the self-propelled transporter units 7, no longer carries the load of the transport frame 2 and the component 1 mounted thereon and can be freely removed.

Before or during lowering the transport frame 2 onto the beams 28, load distribution to the beams 28, 28a may be optimized. Mechanical adjustment means 32, which may form part of at least the lateral beams 28, may be employed to adjust the height of the supporting surface and/or the retaining structures (protrusions 29, 30). However, as indicated in FIG. 14, shim elements 33 may additionally or alternatively be used. In this manner, load is not only taken by the central beam 28a, but also by the lateral beams 28.

Figure 16:
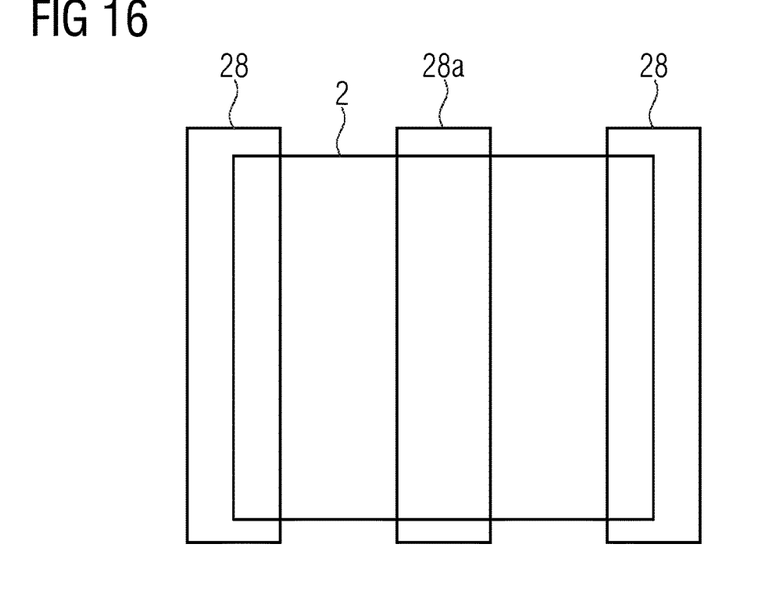
FIG. 16 depicts a schematic top view of the situation of FIG. 15 after removing the transport arrangement.
Figure 17:
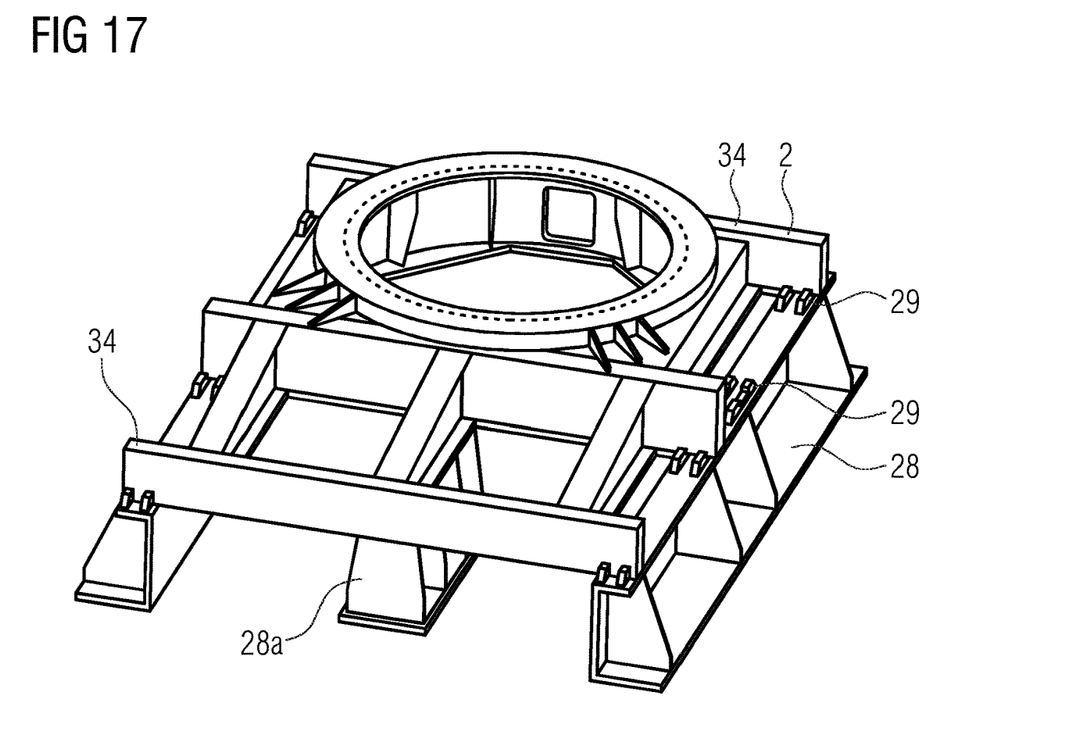
FIG. 17 depicts a perspective view of a concrete embodiment in the situation of FIG. 16.

The transport arrangement 6 may now, again, be driven away, for example to collect the next transport frame 2 with wind turbine component 1 ready for loadout. The resulting configuration is schematically shown in FIG. 16 and for an example concrete embodiment in FIG. 17. In the embodiment of FIG. 17, the protrusion 29 as retaining structure received cross beams 34 of the frame 2 as frame structures.

Figure 18:
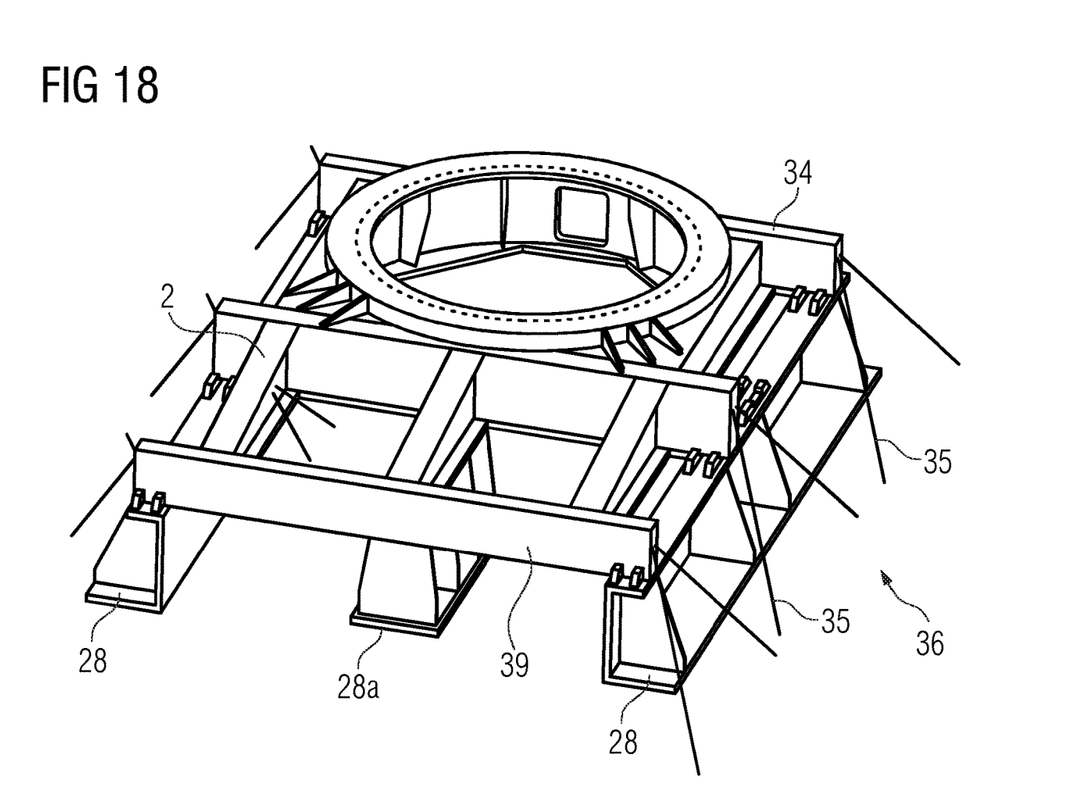
FIG. 18 depicts the concrete embodiment of FIG. 17 being lashed down to the deck of the vessel.

As shown in FIG. 18, the transport frame 2 with the wind turbine component 1 may be lashed onto the vessel deck 36 by ropes 35, where corresponding lashing means, for example D-rings and/or cutouts, of the frame 2, in particular at the cross beams 34, may be used.

It is noted that it is also, in particular additionally, possible to fix the transport frame 2 to the beams 28, 28a by mechanical securing means, for example pin and/or bolt connections.

For unloading the transport frame 2 with the component 1 at the destination of the vessel 25, the transport arrangement 6 may again be employed, as already described.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for transporting a component of a wind turbine to a storing position and storing the component, wherein the component is mounted on a transport frame, the method comprising:
   providing a transport arrangement comprising at least two elongate, height-adjustable, self-propelled transporter units mechanically connected at a trailing end of the transport arrangement;
   positioning the transport frame with the component mounted thereon onto the transport arrangement such that the at least two self-propelled transporter units are spaced apart by at least a predefined lateral distance from each other to create a free space therebetween, at a front end opposite the trailing end;
   using the transport arrangement, rolling the component to the storing position where at least one support device has been positioned, such that at least a part of the at least one support device passes through the free space at the front end of the transport arrangement and is located between a pair of the at least two self-propelled transporter units;
   lowering the at least two self-propelled transporter units such that the transport frame comes to rest on the at least one support device; and
   removing the transport arrangement from under the transport frame.

2. The method according to claim 1, wherein the at least two self-propelled transporter units are arranged parallel to at least one pair of parallel base sides of the transport frame.

3. The method according to claim 1, wherein the at least two self-propelled transporter units are mechanically spaced apart by employing a spacer unit at a trailing end of the at least two self-propelled transporter units or that the at least two self-propelled transporter units are electronically spaced apart by controlling the at least two self-propelled transporter units synchronously.

4. The method according to claim 1, wherein multiple support devices are used in addition to the at least one support device, wherein the at least one support device located between the at least two self-propelled transporter units supports the transport frame centrally when lowered onto the multiple support devices, further wherein at least one of the support devices of the multiple support devices is positioned to support the transport frame laterally when lowered onto the multiple support devices.

5. The method according to claim 4, wherein the multiple support devices include three elongate, parallelly oriented support devices positioned at the storing position such that each of the at least two self-propelled transporter units moves into a space between the multiple support devices.

6. The method according to claim 1, wherein a beam and/or a concrete block is used as the at least one support device.

7. The method according to claim 1, wherein the at least one support device comprises a retaining structure for retaining the transport frame and/or a fastening means for fastening the transport frame in the storing position, the retaining structure being protrusions on an upper surface engaging with and/or receiving a corresponding frame structure.

8. A method for transporting a component of a wind turbine on a vessel, the method comprising:
    transporting the component to a storing position on the vessel using the method according to claim 1; and
    moving the vessel to a destination while the component is stored in the storing position.

9. The method according to claim 8, wherein after the vessel reaches the destination, further comprising:
    positioning the transport arrangement under the transport frame in the storage position, such that at least the part of the at least one support device is located between the pair of the at least two self-propelled transporter units, which are spaced apart by at least the predefined lateral distance from each other,
    increasing a height of the at least two self-propelled transporter units such that the transport frame is lifted from the at least one support device and supported on the at least two self-propelled transporters, and
    rolling the component from the vessel using the transport arrangement.

10. The method according to claim 8, wherein after the transport frame is lowered onto the at least one support device in the storing position, the transport frame and/or the at least one support device is secured in position by additional securing means, further wherein the transport frame is fixed to the at least one support device by a pin or bolt connection, and/or the transport frame and/or the at least one support device is lashed down to a deck of the vessel.

11. The method according to claim 10, wherein at least one lashing means of the transport frame and/or the at least one support device comprising a D-ring and/or a cutout, are used for lashing the transport frame and/or the at least one support device down to the deck of the vessel.

* * * * *